United States Patent
Sugita et al.

(10) Patent No.: US 9,882,307 B2
(45) Date of Patent: Jan. 30, 2018

(54) MOLDED ELECTRIC WIRE

(71) Applicant: Hitachi Metals, Ltd., Tokyo (JP)

(72) Inventors: Keisuke Sugita, Hitachi (JP); Akinari Nakayama, Hitachinaka (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/051,129

(22) Filed: Feb. 23, 2016

(65) Prior Publication Data
US 2016/0254615 A1 Sep. 1, 2016

(30) Foreign Application Priority Data

Feb. 27, 2015 (JP) ................. 2015-039554

(51) Int. Cl.
| | |
|---|---|
| *H01B 7/00* | (2006.01) |
| *H01R 13/58* | (2006.01) |
| *H01R 13/52* | (2006.01) |
| *H01B 7/282* | (2006.01) |
| *H01R 4/70* | (2006.01) |

(52) U.S. Cl.
CPC ......... *H01R 13/5845* (2013.01); *H01B 7/282* (2013.01); *H01R 4/70* (2013.01); *H01R 13/5205* (2013.01)

(58) Field of Classification Search
CPC . H01B 3/00; H01B 3/30; H01B 3/421; H01B 7/02; H01B 7/0208; H01B 7/0216; H01B 7/0225; H01B 7/0275; H01B 7/0291; H01B 7/08; H01B 11/002; C08L 23/06; C08L 23/08; C08L 23/12; C08L 23/16; C08L 33/04; C08L 75/04; C08K 13/02; C08K 3/34; C08K 5/134; H01R 4/02; H01R 4/023; H01R 9/03; H01R 9/07; H01R 9/0707
USPC ...... 174/110 R, 113 R, 117 R, 120 R, 121 A, 174/74 R, 78
See application file for complete search history.

(56) References Cited

U.S. PATENT DOCUMENTS

| | | | | |
|---|---|---|---|---|
| 4,734,545 | A | * | 3/1988 | Susuki ................ B60R 16/0215 174/110 SR |
| 4,963,698 | A | * | 10/1990 | Chang ..................... H01R 4/70 156/49 |
| 6,064,002 | A | * | 5/2000 | Hayami ................ H01B 7/295 174/564 |
| 6,242,097 | B1 | * | 6/2001 | Nishiguchi ............ B32B 27/08 174/110 N |
| 6,482,036 | B1 | * | 11/2002 | Broussard ............ H01R 13/523 439/606 |

(Continued)

FOREIGN PATENT DOCUMENTS

| | | | | |
|---|---|---|---|---|
| CN | 101712777 A | * | 5/2010 | ............. C08L 23/06 |
| JP | 10-233124 A | * | 9/1998 | ............. H01B 7/18 |

(Continued)

*Primary Examiner* — William H Mayo, III
(74) *Attorney, Agent, or Firm* — Roberts Mlotkowski Safran Cole & Calderon P.C.

(57) ABSTRACT

A molded electric wire is composed of a conductor wire, an insulating member coating a circumference of the conductor wire, including a thermoplastic polyurethane, and having an arithmetic average surface roughness of not smaller than 5 μm and not greater than 100 μm, and a molded resin part directly coating a terminal of the insulating member.

9 Claims, 5 Drawing Sheets

(56) References Cited

U.S. PATENT DOCUMENTS

| | | | | |
|---|---|---|---|---|
| 6,511,726 B1 * | 1/2003 | Kinigakis | ................. | A61L 9/04 |
| | | | | 215/341 |
| 8,829,350 B2 * | 9/2014 | Iwasaki | ................ | C08K 5/0025 |
| | | | | 174/110 R |
| 9,000,301 B2 * | 4/2015 | Hayakawa | .......... | B60R 16/0215 |
| | | | | 174/113 R |
| 2011/0290555 A1 * | 12/2011 | Huang | ................. | H01B 7/0045 |
| | | | | 174/70 R |

FOREIGN PATENT DOCUMENTS

| | | | | |
|---|---|---|---|---|
| JP | 2004-273121 A | * | 9/2004 | ........... H01B 7/0295 |
| JP | 2004-281057 A | * | 10/2004 | ........... H01B 7/0295 |
| JP | 2007-095439 A | | 4/2007 | |
| JP | 2007-95439 A | * | 5/2007 | ............... H01B 7/02 |

* cited by examiner

20 MOLDED ELECTRIC WIRE

MOLDED ELECTRIC WIRE

The present application is based on Japanese patent application No. 2015-039554 filed on Feb. 27, 2015, the entire contents of which are incorporated herein by reference.

BACKGROUND OF THE INVENTION

1. Field of the Invention

This invention relates to a molded electric wire.

2. Description of the Related Art

Conventionally, for electronic components such as sensors and the like, molded electric wires are known with an electronic circuit connected to a cable end, with a connecting portion therefor and a periphery therearound coated and protected by a molded resin part (See e.g. JP-A-2007-95439).

For these molded electric wires for use in automobiles, robots, electronic devices, etc. requiring high reliability, the waterproof and airtightness between the molded resin part and the cable are one of very important properties.

In a molded electric wire disclosed in JP-A-2007-95439, a sheath and an insulator are removed from a cable terminal, and an exposed conductor wire is connected to a sensor, and a molded resin part coats the sensor, the exposed conductor wire, and the terminal of the sheath. This molded resin part comprises a polyamide resin or a polybutylene terephthalate resin, while the sheath comprises a thermoplastic polyurethane based resin composition.

SUMMARY OF THE INVENTION

As in the cable disclosed in JP-A-2007-95439, with the molded electric wire having the structure coated to the terminal of the sheath by the molded resin part, further increasing the airtightness requires enhancement in the adhesion between the sheath and the molded resin part.

On the other hand, a molded electric wire having a structure coated to the exposed insulator at the terminal of the cable by the molded resin part without coating the sheath has been studied. This structure allows for reducing the size of the molded resin part, reducing the bending radius of the cable adjacent to the molded resin part, and enhancing the routing of the cable, in comparison with the structure coated to the sheath by the molded resin part. With the molded electric wire having the structure coated to the exposed insulator at the terminal of the cable by the molded resin part without coating the sheath, further increasing the airtightness requires enhancement in the adhesion between the insulator and the molded resin part.

Accordingly, it is an object of the present invention to provide a molded electric wire having excellent airtightness.

According to an aspect of an embodiment of the present invention, a molded electric wire comprises:

a conductor wire;

an insulating member coating a circumference of the conductor wire, the insulating member comprising a thermoplastic polyurethane, and having an arithmetic average surface roughness of not smaller than 5 µm and not greater than 100 µm; and a molded resin part directly coating a terminal of the insulating member.

In the embodiment, the following modifications and changes may be made.

(i) The molded resin part comprises a polyamide or a polybutylene terephthalate.

(ii) The insulating member further comprises a matting agent.

(iii) The matting agent comprises an inorganic compound powder or crosslinked polymer particles.

(iv) The insulating member comprises an insulator, which directly coats the circumference of the conductor wire.

(v) The insulating member comprises a sheath, which indirectly coats the circumference of the conductor wire.

(vi) The molded electric wire comprises a multiplicity of electrically insulated wires each comprising the conductor wire and the insulator, wherein terminals of the multiplicity of electrically insulated wires are being coated by the molded resin part together.

(vii) The molded electric wire includes a sheath coating the circumferences of the multiple of electrically insulated wires together, wherein the molded resin part is not in contact with the sheath.

(viii) The airtightness inside the molded resin part is maintained, even after 1000 cycles of heat shock testing where one cycle of the heat shock testing refers to being left unattended at a temperature of −40 degrees Celsius for 30 minutes and left unattended at a temperature of 125 degrees Celsius for 30 minutes.

(Points of the Present Invention)

The present invention can provide the molded electric wire having excellent airtightness.

BRIEF DESCRIPTION OF THE DRAWINGS

The preferred embodiments according to the present invention will be explained below referring to the drawings, wherein.

DETAILED DESCRIPTION OF THE PREFERRED EMBODIMENTS

Figure 1A:
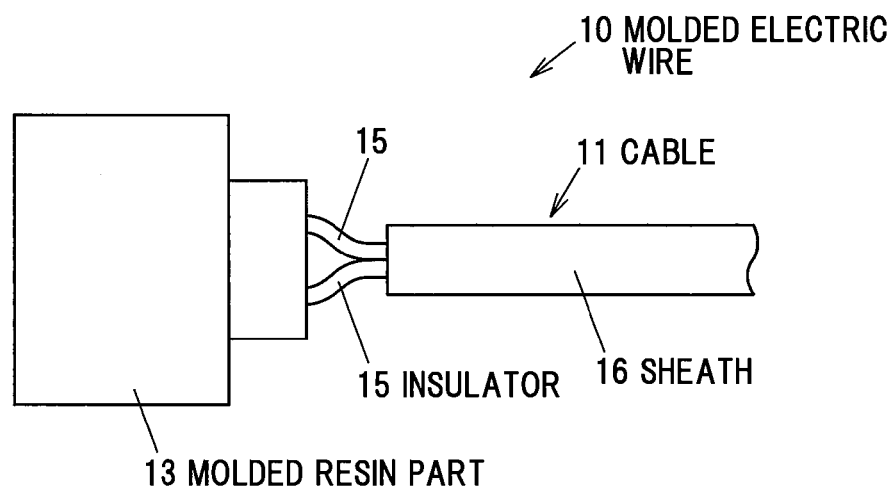
FIG. 1A is a side view showing a molded electric wire in a first exemplary embodiment of the present invention.

Below will be described exemplary embodiments of the present invention, in conjunction with the accompanying drawings. Note that throughout the drawings, elements having substantially the same functions will be given the same reference numerals, and duplicated descriptions thereof will be omitted.

First Embodiment (Configuration of Molded Electric Wire)

Figure 1B:
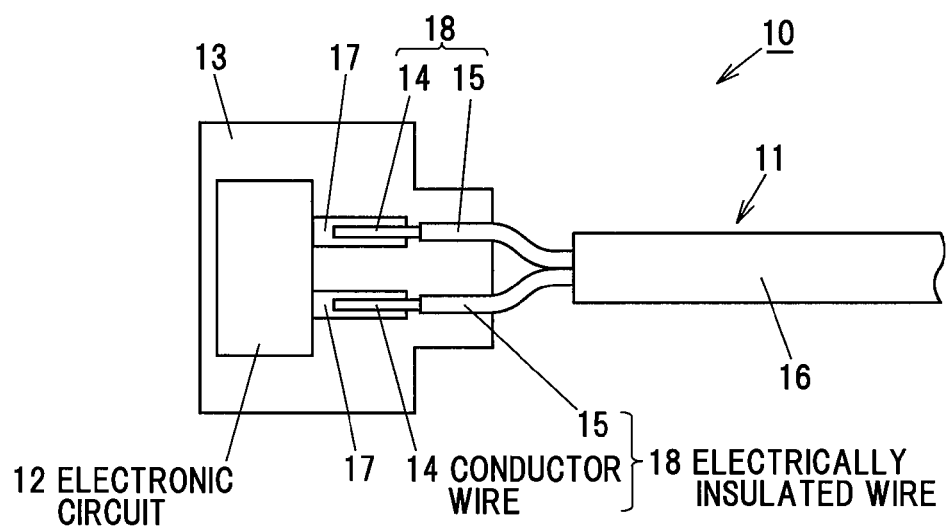
FIG. 1B is a side view showing the molded electric wire with a molded resin part cut along a length of the molded electric wire in the first exemplary embodiment.

FIG. 1A is a side view showing a molded electric wire 10 in a first embodiment of the present invention. FIG. 1B is a side view showing the molded electric wire 10 with a molded resin part 13 cut along a length of the molded electric wire 10.

The molded electric wire 10 includes a cable 11, an electronic circuit 12, which is connected to a terminal of the cable 11, and a molded resin part 13, which coats the electronic circuit 12 to protect it. The electronic circuit 12 is an electronic circuit, which constitutes an electronic device such as a sensor or the like.

Figure 2:
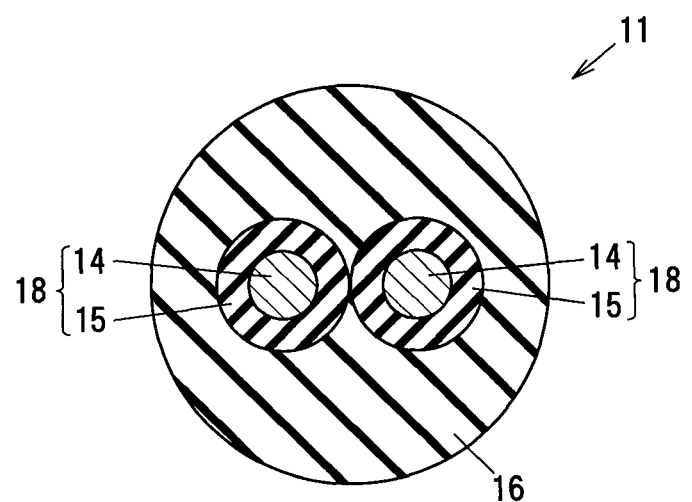
FIG. 2 is a radial cross sectional view showing a cable included in the molded electric wire.

FIG. 2 is a radial cross sectional view showing the cable 11 included in the molded electric wire 10.

The cable 11 includes conductor wires 14, insulators 15, which are configured as insulating members to coat circumferences of the conductor wires 14 respectively, and a sheath 16, which coats an outer perimeter of the insulators 15. The conductor wires 14 and the insulators 15 constitute electrically insulated wires 18 respectively.

At the terminal of the cable 11, the sheath 16 is removed therefrom, to expose the insulators 15. Furthermore, terminals of the exposed insulators 15 are removed, to expose the conductor wires 14. The exposed conductor wires 14 are connected to electrode terminals 17, respectively, of the electronic circuit 12.

The molded resin part 13 coats the electronic circuit 12, the electrode terminals 17 of the electronic circuit 12, the exposed conductor wires 14, and the terminals of the insulators 15, but does not coat the sheath 16. The molded resin part 13 directly coats the insulators 15, so that the airtightness inside the molded resin part 13 is ensured by the high adhesion between the molded resin part 13 and the insulators 15.

The molded resin part 13 is formed by injection molding or the like. As the resin for constituting the molded resin part 13, it is preferable to use a polyamide, or a polybutylene terephthalate, and in order to increase its strength, it is more preferable to include a glass fiber therein.

The insulators 15 are made of a thermoplastic polyurethane, and are formed by extrusion coating the thermoplastic polyurethane over the conductor wires 14. As a method for extrusion coating, it is possible to use a known method using an extruder.

As the thermoplastic polyurethane for constituting the insulators 15, it is possible to use a polyester based polyurethane (adipate based, caprolactone based, or polycarbonate based polyurethane), or a polyether based polyurethane. In particular, from the point of view of resistance to heat and humidity, etc., it is preferable to use a polyether based polyurethane. The hardness of the insulators 15 is not particularly limited. Note that no resins, such as cross-linked polyethylenes, which have conventionally been used as materials for insulators, can be used as the material for the insulators 15 due to having a low adhesion to the material for the molded resin part 13, such as polyamide resin, polybutylene terephthalate resin, or the like.

In addition, the surface roughness (arithmetic average roughness: Ra) of the insulators 15 is not smaller than 5 μm and not greater than 100 μm. Configuring the insulators 15 to have their surface roughness (Ra) of not smaller than 5 μm increases the adhesive force between the insulators 15 and the molded resin part 13, and thereby enhances the airtightness inside the molded resin part 13. When the resin part 13 is molded, the resin material to form the molded resin part 13 flows into irregularities in the surfaces of the insulators 15, and hardens. When the surface roughness (Ra) of the insulators 15 is not smaller than 5 μm, the adhesive force between the insulators 15 and the molded resin part 13 is considered to be increased by the occurrence of the anchoring effect between the molded resin part 13 having flowed into irregularities in the surfaces of the insulators 15 and the insulators 15.

For example, by configuring the insulators 15 to have their surface roughness (Ra) of not smaller than 5 μm, the adhesion between the insulators 15 and the molded resin part 13 is maintained, and the airtightness inside the molded resin part 13 is maintained, even after 1000 cycles of heat shock testing where one cycle of the heat shock testing refers to being left unattended at a temperature of −40 degrees Celsius for 30 minutes and left unattended at a temperature of 125 degrees Celsius for 30 minutes.

Also, when the surface roughness (Ra) of the insulators 15 is small, the contact area of the insulators 15 in contact with the conductor wires 14 increases so that the adhesion of the insulators 15 to the conductor wires 14 is high, but if the surface roughness (Ra) of the insulators 15 is smaller than 5 μm, the adhesive force between the insulators 15 and the conductor wires 14 is too strong, making it difficult to peel the electrically insulated wires 18 when terminating the electrically insulated wires 18. Further, when a multiplicity of the electrically insulated wires 18 are included in the molded electric wire 10, the electrically insulated wires 18 stick together, worsening handleability or manipulability when drawn or stranded.

On the other hand, if the surface roughness (Ra) of the insulators 15 is greater than 100 μm, their extruded appearance worsens significantly, and the elongation (tensile elongation) of the insulators 15 decreases.

Incidentally, when the insulators 15 are formed in conventional general conditions, the surface roughness (Ra) is on the order of 0.4 μm. One way to increase the surface roughness (Ra) of the insulators 15 is to add a matting agent. As the matting agent, it is possible to use, for example, an inorganic compound powder, such as calcium carbonate powder, talc powder, mica powder, silica powder, or the like, or cross-linked polymer particles, such as polystyrene particles, polyurethane particles, or the like.

In addition, the surface roughness (Ra) of the insulators 15 may also be increased by adjusting extrusion conditions (extrusion temperature, take-up speed, etc.) for extrusion coating of the insulators 15, and increasing the shear stress caused in the thermoplastic polyurethane material. As specific methods for adjusting the extrusion conditions, there are listed the method by altering the sizes or locational configurations of the extruder, die, or nipple so as to narrow a flow path for the material, the method by lowering the extrusion temperature, the method by increasing the take-up speed of the electrically insulated wires 18, and the like.

In addition, if desired, to the thermoplastic polyurethane material for the insulators 15 may be added additives such as a processing aid, a flame retardant, a flame retardant aid, a crosslinking agent, a crosslinking aid, an antioxidant, an ultraviolet absorber, a copper inhibitor, a lubricant, an inorganic filler, an adhesion imparting agent, a stabilizer, a carbon black, a coloring agent, etc.

As a material for the conductor wires 14, it is possible to use a known material such as copper, annealed copper, silver, aluminum, or the like. Moreover, in order to enhance the heat resistance thereof, the surfaces of those materials may be plated with tin, nickel, silver, gold or the like.

The number of electrically insulated wires 18 included in the molded electric wire 10 may be one or more (two in the example shown in FIGS. 1A, 1B, and 2). When the molded electric wire 10 includes a multiplicity of the electrically insulated wires 18, the terminals of the multiplicity of electrically insulated wires 18 are coated with the single molded resin part 13 together, as shown in FIGS. 1A and 1B.

As a material for the sheath 16, it is possible to use a general material such as a thermoplastic polyurethane, a polyolefin based resin or the like, and, in addition, in order to impart the heat resistance, etc. to those materials, those materials may be crosslinked.

Figure 3:
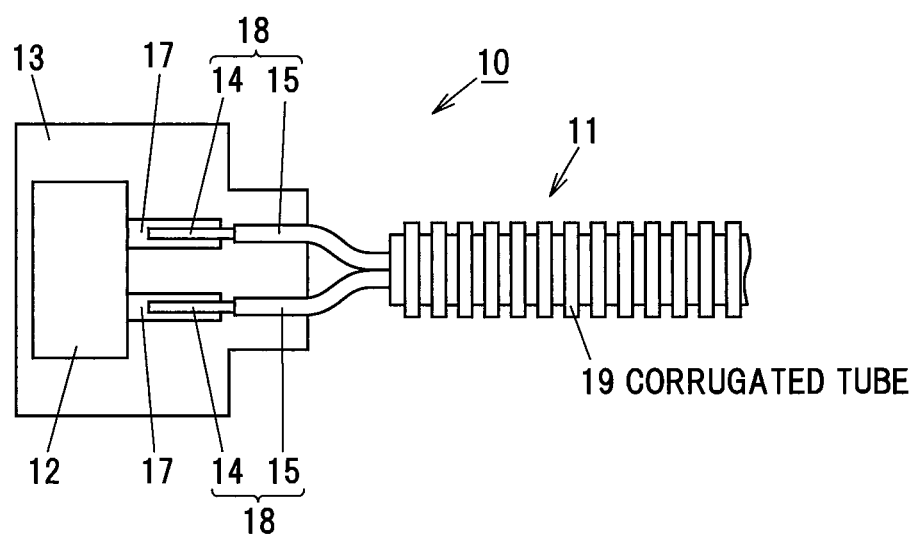
FIG. 3 is a side view showing a modification to the molded electric wire in the first exemplary embodiment of the present invention.

Note that, as shown in FIG. 3, a corrugated tube 19 may be used in place of the sheath 16. The use of the corrugated tube 19 allows for enhancing the impact resistance, etc. of the cable 11 while maintaining the ease of bending of the cable 11. As a material for the corrugated tube 19, it is possible to use a general material such as a polypropylene, a polyamide or the like, and it is preferable that they be flame retarded. Incidentally, as with FIG. 1B, FIG. 3 is a side view showing the molded electric wire 10 with the molded resin part 13 cut along the length of the molded electric wire 10.

A protective tape may also be used in place of the sheath 16 by being wrapped around the outer perimeter of the insulators 15.

Advantageous Effects of the First Embodiment

Since the molded electric wire 10 in the first embodiment has the high adhesion between the insulators 15 and the molded resin part 13, it is possible to sufficiently ensure the airtightness inside the molded resin part 13, and it is possible to enhance the workability, handleability, manipulability, etc. of the electrically insulated wires 18 by reducing the adhesive properties of the insulators 15. Furthermore, the molded electric wire 10 is also excellent in tensile elongation properties of the insulators 15.

Also, since the molded resin part 13 coats the electronic circuit 12, the electrode terminals 17 of the electronic circuit 12, the exposed conductor wires 14, and the terminals of the insulators 15 but without coating the sheath 16, the routing of the molded electric wire 10 is enhanced, and also the size of the molded resin part 13 can be reduced.

Second Embodiment

A molded electric wire in a second embodiment differs from the molded electric wire in the first embodiment in that it is coated to a sheath of a cable with a molded resin part.

Configuration of the Molded Electric Wire in the Second Embodiment

Figure 4A:
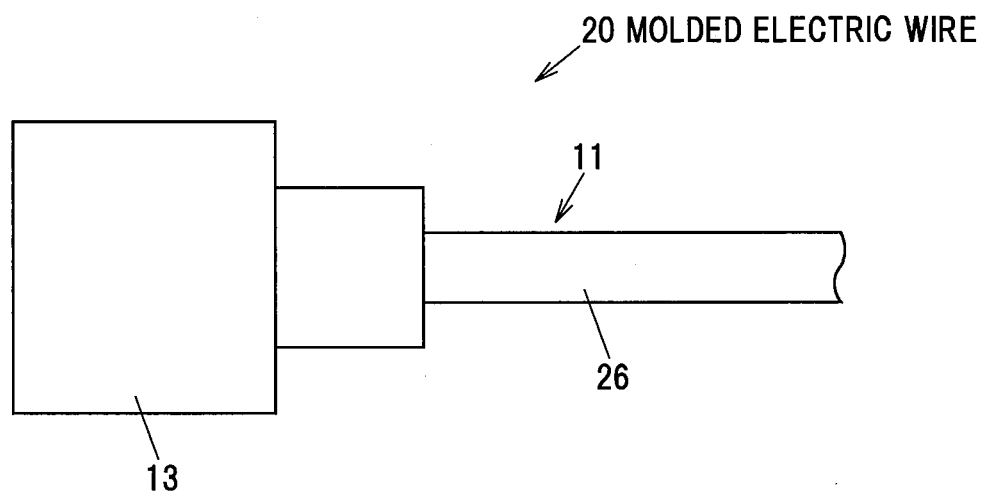
FIG. 4A is a side view showing a molded electric wire in a second exemplary embodiment of the present invention.
Figure 4B:
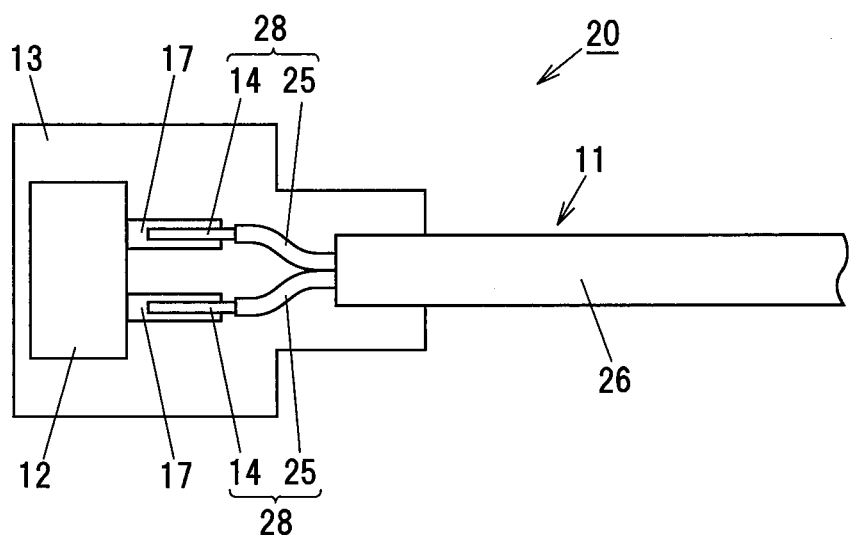
FIG. 4B is a side view showing the molded electric wire with a molded resin part cut along a length of the molded electric wire in the second exemplary embodiment.

FIG. 4A is a side view showing a molded electric wire 20 in the second embodiment of the present invention. FIG. 4B is a side view showing the molded electric wire 20 with the molded resin part 13 cut along the length of the molded electric wire 20.

As with the molded electric wire 10 in the first embodiment, the molded electric wire 20 includes a cable 11, an electronic circuit 12, which is connected to a terminal of the cable 11, and a molded resin part 13, which coats the electronic circuit 12 to protect it.

The molded resin part 13 coats the electronic circuit 12, electrode terminals 17 of the electronic circuit 12, exposed conductor wires 14, terminals of insulators 25, and a terminal of a sheath 26. The molded resin part 13 directly coats the sheath 26, so that the airtightness inside the molded resin part 13 is ensured by the high adhesion between the molded resin part 13 and the sheath 26.

As with the insulators 15 of the molded electric wire 10 in the first embodiment, the sheath 26 configured as an insulating member in the second embodiment is made from a thermoplastic polyurethane, and has a surface roughness (Ra) of not smaller than 5 μm and not greater than 100 μm.

Configuring the sheath 26 to have their surface roughness (Ra) of not smaller than 5 μm increases the adhesive force between the sheath 26 and the molded resin part 13, and thereby enhances the airtightness inside the molded resin part 13. When the resin part 13 is molded, the resin material to form the molded resin part 13 flows into irregularities in the surfaces of the sheath 26, and hardens. When the surface roughness (Ra) of the sheath 26 is not smaller than 5 μm, the adhesive force between the sheath 26 and the molded resin part 13 is considered to be increased by the occurrence of the anchoring effect between the molded resin part 13 having flowed into irregularities in the surfaces of the sheath 26 and the sheath 26.

For example, by configuring the sheath 26 to have its surface roughness (Ra) of not smaller than 5 μm, the adhesion between the sheath 26 and the molded resin part 13 is maintained, and the airtightness inside the molded resin part 13 is maintained, even after 1000 cycles of heat shock testing where one cycle of the heat shock testing refers to being left unattended at a temperature of −40 degrees Celsius for 30 minutes and left unattended at a temperature of 125 degrees Celsius for 30 minutes.

On the other hand, if the surface roughness (Ra) of the sheath 26 is greater than 100 μm, its extruded appearance worsens significantly, and the elongation (tensile elongation) of the sheath 26 decreases.

In the molded electric wire 20, since the airtightness inside the molded resin part 13 is ensured by the adhesion of the molded resin part 13 to the sheath 26, the material for the insulators 25 is not particularly limited, but may use a material, which has conventionally generally been used, such as a cross-linked polyethylene or the like.

The number of electrically insulated wires 28 included in the molded electric wire 20 may be one or more (two in the example shown in FIG. 4B). When the molded electric wire 20 includes a multiplicity of the electrically insulated wires 28, the terminals of the multiplicity of electrically insulated wires 28 are coated with the single molded resin part 13 together, as shown in FIG. 4B.

Advantageous Effects of the Second Embodiment

Since the molded electric wire 20 in the second embodiment has the high adhesion between the sheath 26 and the molded resin part 13, it is possible to sufficiently ensure the airtightness inside the molded resin part 13. Furthermore, the molded electric wire 20 is also excellent in tensile elongation properties of the sheath 26.

Summary of the Embodiments

Next, the technical concept that is ascertained from the exemplary embodiments described above will be described with the aid of the reference characters and the like in the exemplary embodiments. It should be noted, however, that each of the reference characters in the following description should not be construed to limit the elements in the claims to the members and the like specifically shown in the exemplary embodiments.

[1] A molded electric wire (10, 20), comprising:
a conductor wire (14);
an insulating member coating a circumference of the conductor wire (14), the insulating member comprising a thermoplastic polyurethane, and having an arithmetic average surface roughness of not smaller than 5 μm and not greater than 100 μm; and a molded resin part (13) directly coating a terminal of the insulating member.

[2] The molded electric wire (10, 20) according to [1] above, wherein the molded resin part (13) comprises a polyamide or a polybutylene terephthalate.

[3] The molded electric wire (10, 20) according to [1] or [2] above, wherein the insulating member further comprises a matting agent.

[4] The molded electric wire (10, 20) according to [3] above, wherein the matting agent comprises an inorganic compound powder or crosslinked polymer particles.

[5] The molded electric wire (10) according to any one of [1] to [4] above, wherein the insulating member comprises an insulator (15), which directly coats the circumference of the conductor wire (14).

[6] The molded electric wire (20) according to any one of [1] to [4] above, wherein the insulating member comprises a sheath (26), which indirectly coats the circumference of the conductor wire (14).

[7] The molded electric wire (10) according to [5] above, comprising a multiplicity of electrically insulated wires (18) each comprising the conductor wire (14) and the insulator (15), wherein terminals of the multiplicity of electrically insulated wires (18) are being coated by the molded resin part (13) together.

[8] The molded electric wire (10) according to [7] above, including a sheath (16) coating the circumferences of the multiple of electrically insulated wires (18) together, wherein the molded resin part (13) is not in contact with the sheath (16).

[9] The molded electric wire (10, 20) according to any one of [1] to [8] above, wherein the airtightness inside the molded resin part (13) is maintained, even after 1000 cycles of heat shock testing where one cycle of the heat shock testing refers to being left unattended at a temperature of −40 degrees Celsius for 30 minutes and left unattended at a temperature of 125 degrees Celsius for 30 minutes.

Example

Below are described results of testing to evaluate the adhesion between the molded resin part 13 and the insulators 15 of the molded electric wire 10 in the first embodiment, and the adhesion between the molded resin part 13 and the sheath 26 of the molded electric wire 20 in the second embodiment.

(Configuration of the Evaluation Sample)

Figure 5A:
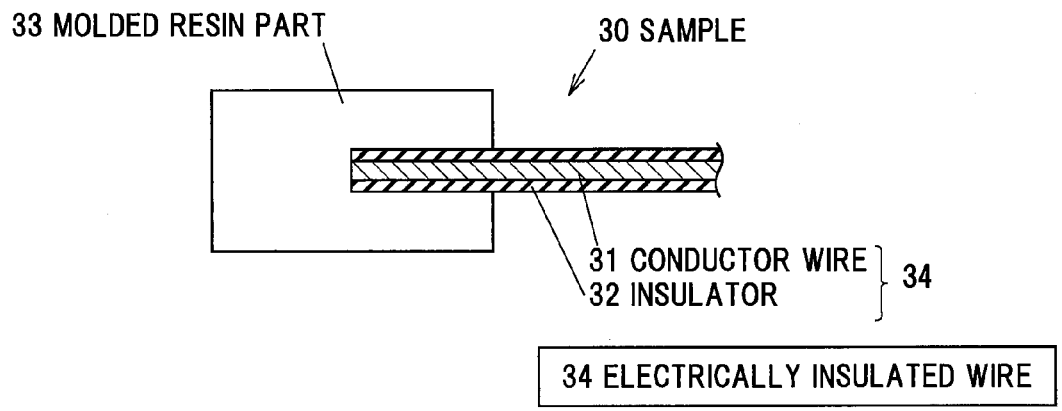
FIG. 5A is an enlarged cross sectional view showing an essential portion of a sample used in a test in an example of the present invention.

FIG. 5A is an enlarged cross sectional view showing an essential portion of a sample 30 used for testing in the present example. The sample 30 included a conductor wire 31, an insulator 32, which coated a circumference of the conductor wire 31, and a molded resin part 33, which coated one terminal of the insulator 32.

The conductor wire 31 was a stranded wire composed of seven copper conductor wires having a diameter of 0.26 mm, and was configured in such a manner that the air could pass through the conductor wire 31 inside the insulator 32.

The insulator 32 was made of Elastollan ET890 (available from BASF Japan Ltd.) thermoplastic polyurethane. In addition, Elastollan masterbatch ST (available from BASF Japan Ltd.), which was used as a matting agent, was added to the thermoplastic polyurethane.

The molded resin part 33 had a cylindrical shape with a diameter of 15 mm and a length of 20 mm, and an insertion length of an electrically insulated wire 34 composed of the conductor wire 31 and the insulator 32 into the molded resin part 33 was 5 mm.

Moreover, the molded resin part 33 was made of Reny 1002F (available from Mitsubishi Engineering Plastics Corporation), polyamide containing 30 mass % of glass fibers, or Novaduran 5010G30X4 (available from Mitsubishi Engineering Plastics Corporation), polybutylene terephthalate containing 30 mass % of glass fibers.

Note that, as will be described later, airtightness evaluation was conducted on the sample 30 formed with the molded resin part 33, and other evaluations were conducted on the electrically insulated wire 34 composed of the conductor wire 31 and the insulator 32 before being formed with the molded resin part 33.

(Production of the Sample to be Evaluated)

Using a 40 mm extruder (L/D=24, L: screw length, D: screw diameter), the conductor wire 31 was extrusion coated with the above mentioned insulating material, to form the insulator 32 having an outer diameter of 1.5 mm. The extruded electrically insulated wire 34 composed of the conductor wire 31 and the insulator 32 was wound around a bobbin having a barrel diameter of 300 mm. The total length of each electrically insulated wire 34 was 300 m.

The molded resin part 33 was formed by injection molding using an insert molding die.

In the present example, seven samples 30 with their respective insulators 32 produced in different insulator production conditions were prepared and evaluated. For each of the samples 30, specific producing conditions for their respective insulators 32 will be described later.

(Evaluation Method)

<Surface Roughness Evaluation>

The arithmetic average roughness (Ra) of a surface of the insulator 32 of the electrically insulated wire 34 was determined by a non-contact measurement using a laser microscope.

<Adhesiveness Evaluation>

After the electrically insulated wire 34 was extruded, wound around the bobbin, and left unattended for 1 week, the presence/absence of the adhesiveness of the insulator 32 when drawn out was visually identified.

<Terminal Workability Evaluation>

The electrically insulated wire 34 was cut into a length of 100 mm, and the insulator 32 was removed therefrom with 25 mm left. The electrically insulated wire 34 end at which the conductor wire 31 was exposed was then fixed, and the insulator 32 was pulled, and the force when the insulator 32 was pulled out from the conductor wire 31 was measured. If this pull-out force was not greater than 35 N, the electrically insulated wire 34 was accepted.

<Tensile Elongation Evaluation>

After the terminal workability evaluation, the insulator 32 pulled out from the conductor wire 31 was pulled at a speed of 200 mm/min, and its elongation was measured. If the elongation was not shorter than 100%, the electrically insulated wire 34 was accepted.

<Airtightness Evaluation>

The airtightness testing and the heat shock testing were alternately repeated to evaluate how long the airtightness was maintained.

Figure 5B:
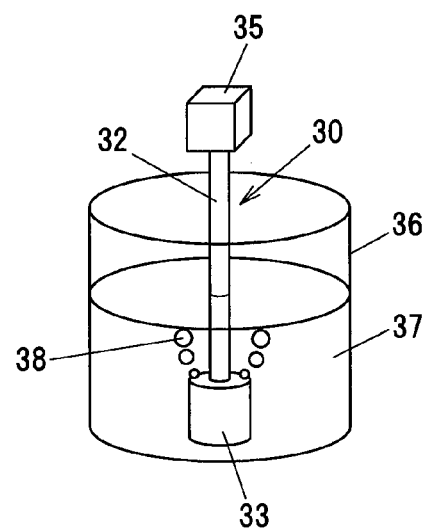
FIG. 5B is a schematic view showing the airtightness testing in the example of the present invention.

FIG. 5B is a schematic view showing the airtightness testing in the present example. As shown in FIG. 5B, the sample 30 was immersed in water 37 in a water tank 36 at its one molded resin part 33 side end, and was connected to an air supply device 35 at the other end.

With the airtightness testing, if the air to be supplied from the air supply device 35 through the conductor wire 31 into the molded resin part 33 leaked in the form of bubbles 38 from the adhesion surface between the molded resin part 13 and the insulator 32, the airtightness was determined as being lost, or if no air bubbles 38 were produced, the airtightness was determined as being maintained. Here, per one airtightness testing, the compressed air of 30 kPa was supplied for 30 seconds from the air supply device 35.

In the heat shock testing, 200 cycles of leaving the sample 30 unattended at a temperature of −40 degrees Celsius for 30 minutes and at a temperature of 125 degrees Celsius for 30 minutes were alternately repeated.

That is, in this airtightness evaluation, each time 200 cycles of the heat shock testing were performed, the airtightness testing was performed, to identify whether the airtightness was being maintained or not. The upper limit of the number of cycles of the heat shock testing was set at 2000, and if the number of cycles of the heat shock testing was not smaller than 1000, the airtightness was accepted.

(Evaluation Results)

Configurations of the seven samples 30 and results of the evaluations of each type are shown in Table 1 below.

In addition, in Table 1, the "airtightness/number of cycles" represents the number of cycles of the heat shock testing during which the sample 30 was able to maintain the airtightness in the above described airtightness evaluation. In addition, the "polyamide" in the "airtightness/number of cycles" item refers to the number of cycles when the molded resin part 33 was made of Reny 1002F polyamide, while the "polybutylene terephthalate" in the "airtightness/number of cycles" item refers to the number of cycles when the molded resin part 33 was made of Novaduran 5010G30X4 polybutylene terephthalate.

As shown in Table 1, No. 1 to 5 samples 30 were accepted for all of the adhesiveness evaluation, the terminal workability evaluation, the tensile elongation evaluation, and the airtightness evaluation.

No. 6 sample 30 was rejected for the adhesiveness evaluation, the terminal workability evaluation, and the airtightness evaluation. This was considered to be because of the decrease in the surface roughness of the insulator 32 caused by the low take-up speed of the extrusion coated insulator 32 and no matting agent added. Note that although No. 5 sample 30 had the same extrusion temperature and the same take-up speed as No. 6 sample 30 during extrusion coating, No. 5 sample 30 was considered to be accepted for those

TABLE 1

|  |  | Sample No. | | | | | | |
|---|---|---|---|---|---|---|---|---|
|  |  | 1 | 2 | 3 | 4 | 5 | 6 | 7 |
| Insulator materials | Thermoplastic polyurethane [parts by mass] | 100 | 100 | 100 | 100 | 100 | 100 | 100 |
|  | Matting agent [parts by mass] | — | — | — | — | 3 | — | — |
| Insulator producing conditions | Extrusion temperature [° C.] | 210 | 210 | 200 | 190 | 210 | 210 | 190 |
|  | Take-up speed [m/min] | 10 | 20 | 15 | 10 | 5 | 5 | 12 |
| Evaluation results | Surface roughness (Ra) [µm] | 5.1 | 22.3 | 63.8 | 98.4 | 11.5 | 0.4 | 100.3 |
|  | Presence/absence of adhesiveness | Absent | Absent | Absent | Absent | Absent | Absent | Absent |
|  | Pullout force [N] | 34.5 | 32 | 28 | 26.5 | 33 | 45 | 26 |
|  | Tensile elongation [%] | 480 | 360 | 320 | 130 | 470 | 530 | 80 |
| Airtightness number of cycles | Polyamide | 1600 | 1800 | 2000 | 2000 | 1800 | 800 | 2000 |
|  | Polybutylene terephthalate | 1400 | 1600 | 1800 | 2000 | 1600 | 600 | 2000 |

In Table 1, the "insulator materials" denote the constituent materials of the insulator 32, the "thermoplastic polyurethane" denotes the content of the thermoplastic polyurethane (Elastollan ET890) configured as a base polymer, and the "matting agent" denotes the content of the matting agent (Elastollan masterbatch ST). The content of each material is indicated by parts by mass per 100 parts by mass of the "thermoplastic polyurethane." In addition, the "insulator producing conditions" refer to extrusion coating conditions for the insulator 32.

In Table 1, the "surface roughness (Ra)" refers to the arithmetic average roughness of the surface of the electrically insulated wire 34 determined in the above described surface roughness evaluation (Ra). The "presence/absence of adhesiveness" refers to the presence or absence of the adhesiveness of the electrically insulated wire 34 identified in the above described adhesiveness evaluation. The "pullout force" refers to the force measured when the insulator 32 was pulled out from the conductor wire 31 in the above described terminal workability evaluation. The "tensile elongation" refers to the elongation of the insulator 32 measured in the above described tensile elongation evaluation.

evaluations because of the increase in the surface roughness of the insulator 32 resulting from the adding of the matting agent to the insulator 32.

No. 7 sample 30 was rejected for the tensile elongation evaluation. This was considered to be because of the excessive increase in the surface roughness of the insulator 32 caused by the too low extrusion temperature and the too high take-up speed of the extrusion coated insulator 32. Note that although No. 5 sample 30 had the same extrusion temperature as No. 7 sample 30 during extrusion coating, No. 5 sample 30 was considered to be accepted for the tensile elongation evaluation because of no excessive increase in the surface roughness of the insulator 32 resulting from the relatively low take-up speed of the insulator 32.

From these results, it was found that when the surface roughness (Ra) of the insulator 32 was not smaller than about 5 µm and not greater than about 100 µm, No. 1 to 5 samples 30 were accepted for all of the adhesiveness evaluation, the terminal workability evaluation, the tensile elongation evaluation, and the airtightness evaluation.

Further, the results obtained with this example confirmed that the molded electric wire 10 in the first embodiment including the insulators 15 made of a thermoplastic polyurethane and having a surface roughness (Ra) of not smaller than 5 μm and not greater than 100 μm and the molded resin part 13 directly coating the terminals of the insulators 15 has the excellent airtightness, and the excellent tensile elongation properties of the insulators 15.

Similarly, the results obtained with this example confirmed that the molded electric wire 10 in the second embodiment including the sheath 26 made of a thermoplastic polyurethane and having a surface roughness (Ra) of not smaller than 5 μm and not greater than 100 μm and the molded resin part 13 directly coating the terminals of the sheath 26 has the excellent airtightness, and the excellent tensile elongation properties of the sheath 26.

Although the exemplary embodiments and the example of the present invention have been described above, the invention is not limited to the above exemplary embodiments and the above example, but various modifications may be made without departing from the spirit and scope of the invention.

Also, the exemplary embodiments and the example described above should not be construed to limit the invention in the appended claims. It should also be noted that not all the combinations of the features described in the exemplary embodiments and the example are essential to the means for solving the problem of the invention.

Although the present invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A molded electric wire, comprising:
    a conductor wire;
    an insulating member coating a circumference of the conductor wire, the insulating member comprising a thermoplastic polyurethane, and having an arithmetic average surface roughness of not smaller than 5 μm and not greater than 100 μm; and
    a molded resin part directly coating a terminal of the insulating member.

2. The molded electric wire according to claim 1, wherein the molded resin part comprises a polyamide or a polybutylene terephthalate.

3. The molded electric wire according to claim 1, wherein the insulating member further comprises a matting agent.

4. The molded electric wire according to claim 3, wherein the matting agent comprises an inorganic compound powder or crosslinked polymer particles.

5. The molded electric wire according to claim 1, wherein the insulating member comprises an insulator, which directly coats the circumference of the conductor wire.

6. The molded electric wire according to claim 1, wherein the insulating member comprises a sheath, which indirectly coats the circumference of the conductor wire.

7. The molded electric wire according to claim 5, comprising a multiplicity of electrically insulated wires each comprising the conductor wire and the insulator,
    wherein terminals of the multiplicity of electrically insulated wires are being coated by the molded resin part together.

8. The molded electric wire according to claim 7, including a completely externally exposed sheath coating the circumferences of the multiple of electrically insulated wires together,
    wherein the molded resin part is not in contact with the sheath and the insulating member is exposed between the molded resin part and the sheath.

9. The molded electric wire according to claim 1, wherein the airtightness inside the molded resin part is maintained, even after 1000 cycles of heat shock testing where one cycle of the heat shock testing refers to being left unattended at a temperature of −40 degrees Celsius for 30 minutes and left unattended at a temperature of 125 degrees Celsius for 30 minutes.

* * * * *